United States Patent
Nicholson et al.

(10) Patent No.: US 12,340,489 B2
(45) Date of Patent: Jun. 24, 2025

(54) OBJECT REMOVAL DURING VIDEO CONFERENCING

(71) Applicant: Lenovo (United States) Inc., Morrisville, NC (US)

(72) Inventors: John Weldon Nicholson, Cary, NC (US); Howard J. Locker, Cary, NC (US); Daryl C Cromer, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 357 days.

(21) Appl. No.: 17/697,242

(22) Filed: Mar. 17, 2022

(65) Prior Publication Data

US 2023/0298143 A1 Sep. 21, 2023

(51) Int. Cl.
| | |
|---|---|
| G06T 5/77 | (2024.01) |
| G06T 7/50 | (2017.01) |
| G06V 20/40 | (2022.01) |
| G06V 20/50 | (2022.01) |

(52) U.S. Cl.
CPC ............... G06T 5/77 (2024.01); G06T 7/50 (2017.01); G06V 20/40 (2022.01); G06V 20/50 (2022.01); G06T 2207/10016 (2013.01)

(58) Field of Classification Search
None
See application file for complete search history.

(56) References Cited

U.S. PATENT DOCUMENTS

| | | | | |
|---|---|---|---|---|
| 11,671,561 | B1 * | 6/2023 | Chang | G06V 40/161 |
| | | | | 348/14.08 |
| 2008/0077953 | A1 * | 3/2008 | Fernandez | H04N 7/18 |
| | | | | 725/32 |
| 2012/0050323 | A1 * | 3/2012 | Baron, Jr. | H04L 12/1818 |
| | | | | 345/632 |
| 2016/0182830 | A1 * | 6/2016 | Hu | H04N 23/62 |
| | | | | 348/231.6 |
| 2017/0134656 | A1 * | 5/2017 | Burgess | H04N 23/6811 |
| 2017/0142371 | A1 * | 5/2017 | Barzuza | H04L 65/403 |
| 2020/0077035 | A1 * | 3/2020 | Yao | G06V 20/52 |
| 2021/0142497 | A1 * | 5/2021 | Pugh | G06T 7/194 |
| 2021/0241422 | A1 * | 8/2021 | Burke, III | G06T 7/30 |
| 2021/0385412 | A1 * | 12/2021 | Matula | H04N 7/15 |

(Continued)

OTHER PUBLICATIONS

Liu, Guilin, "Image Inpainting for Irregular Holes Using Partial Convolutions", Proceedings of theEuropean Conference on Computer Vision (ECCV), Sep. 2018., (Sep. 2018), 16 pgs.

(Continued)

*Primary Examiner* — Juan M Guillermety
(74) *Attorney, Agent, or Firm* — Schwegman Lundberg & Woessner, P.A.

(57) ABSTRACT

A video conferencing system includes an image of a participant in a video conference and a depth map of the image. The system identifies objects in the background of the image, identifies objects in the foreground of the image, and identifies objects in the middle-ground of the image. The system removes the objects from the middle-ground, and replaces the removed objects from the middle-ground with the objects from the background that are located behind the removed objects. The system then uses the image with the removed and replaced objects in a video stream of the video conference.

18 Claims, 6 Drawing Sheets

(56) References Cited

U.S. PATENT DOCUMENTS

2022/0256116 A1* 8/2022 Chu ..................... H04N 7/147
2024/0029472 A1* 1/2024 Shen ..................... G06V 10/82

OTHER PUBLICATIONS

Liu, Guilin, et al., "Image Inpainting for Irregular Holes Using Partial Convolutions", Proceedings of the European Conference on Computer Vision (ECCV), Sep. 2018., (Sep. 2018), 16 pgs.

* cited by examiner

OBJECT REMOVAL DURING VIDEO CONFERENCING

TECHNICAL FIELD

Embodiments described herein generally relate to the removal of objects during video conferencing, and in an embodiment, but not by way of limitation, the removal of objects from the middle ground of an image during video conferencing.

BACKGROUND

During video conference calls there can be many objects or people between the focal person (video conference attendee) and the static background that may be either distracting or private items that the person does not want to share. In addition, while current integrated front facing notebook cameras have limited fields of view, over time the fields of view of these integrated cameras will continue to increase, thereby permitting video conference video capture to include the entire physical space around the user. This will exacerbate the problem by having more potentially private and/or distracting background information (people and objects) that the attendee may not want to be viewed by everyone in the video conference.

One current solution to this issue offers the choice of blurring or replacing the entire background. However, sometimes the attendee does not have a problem with showing the actual background of where they are, e.g., in a coffee shop or in a library.

Other solutions for object removal exist but are focused on still images, not video images. These solutions work entirely in the image domain and are not suitable for use in the video domain because of their latency. Another problem is that the segmentation of an object to be removed might not work in all cases, especially for objects coming into a frame. For example, a passer-by might show up for some number of frames before they are identified as an object to be removed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

To address the issues discussed above, an embodiment of the present disclosure automatically removes any object or person between the focal person and the static background in a field of view of a video conference.

Most video conferencing applications have an option where an attendee can preview his or her video before joining the video conference. This allows the attendee to adjust the field of view and add background blurring and/or different backgrounds if desired. An embodiment disclosed herein can extend the preview to include an option to remove all objects between the focal attendee and the static background.

Many computer notebooks are beginning to add separate infrared (IR) cameras. By having two separate cameras, a stereo view of the scene is available, and a depth estimation can be created. Similarly, light detection and ranging (LIDAR) cameras with excellent depth information are available at commodity prices, and these cameras may become common in personal computer (PC) and tablet devices. There are also several other depth cameras such as structured light (SL) and time-of-flight (TOF) cameras that may be used for this purpose. Finally, progress is being made on depth estimation from a single camera.

Figure 1A:
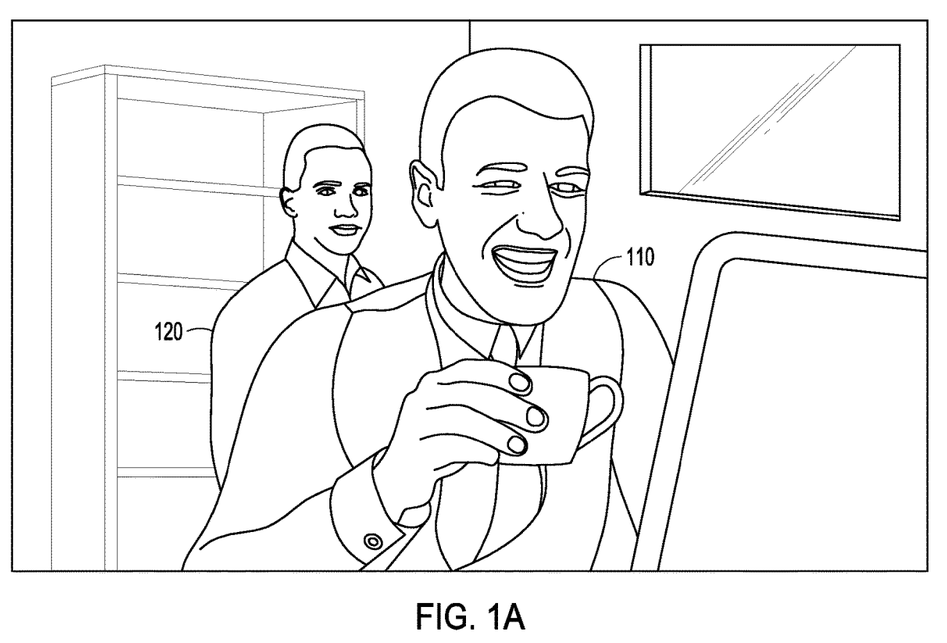
FIGS. 1A and 1B illustrate a video conference image with objects in a middle ground of the image.
Figure 1B:
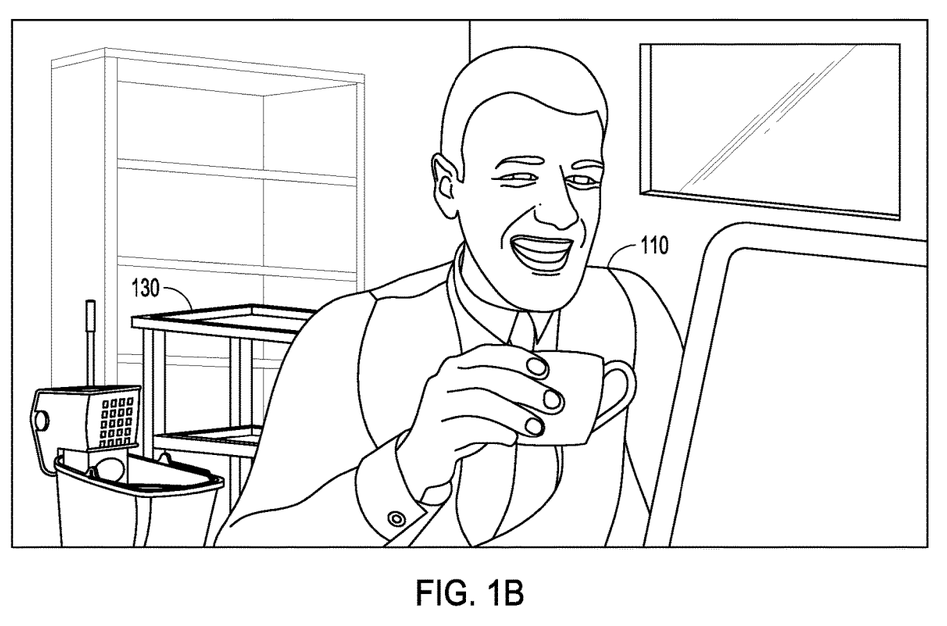

An embodiment uses a depth map to determine what is the "background image" (that is, geometrical shapes that are the farthest away in the depth map), what is the "foreground image" (closest to the camera and/or at the same distance as the video conference attendee), and what objects and/or persons are between the foreground/focal attendee and the background, that is, the middle ground. FIGS. 1A and 1B illustrate an image associated with a video conference. FIG. 1A illustrates a video conference participant 110 with non-participant person 120 in the middle ground, and FIG. 1B illustrates the participant 110 with a janitorial cart 130 in the middle ground.

Figure 1C:
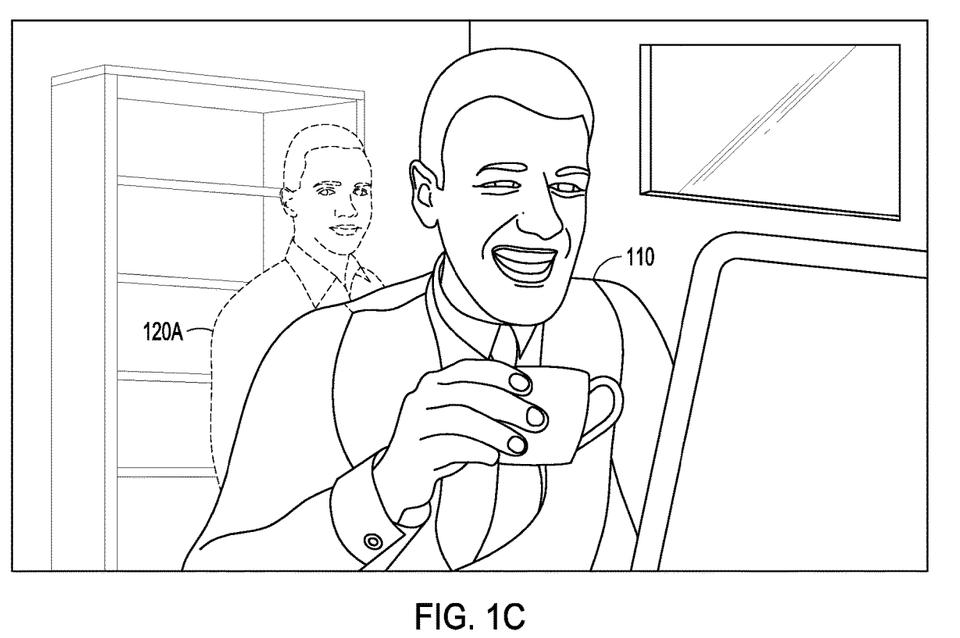
FIG. 1C and FIG. 1D illustrate the images of FIGS. 1A and 1B with the middle ground objects identified.
Figure 1D:
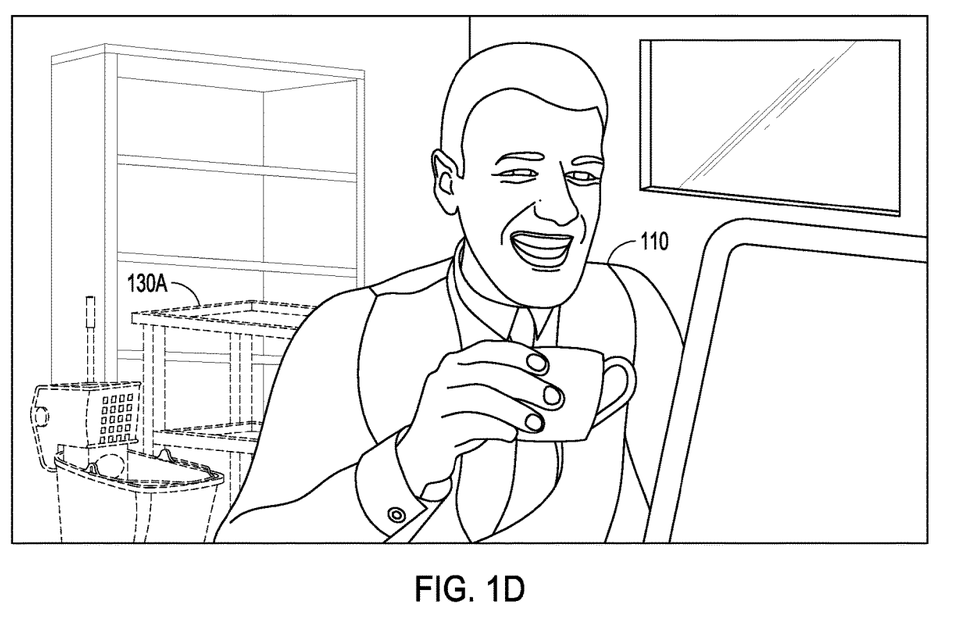
Figure 1E:
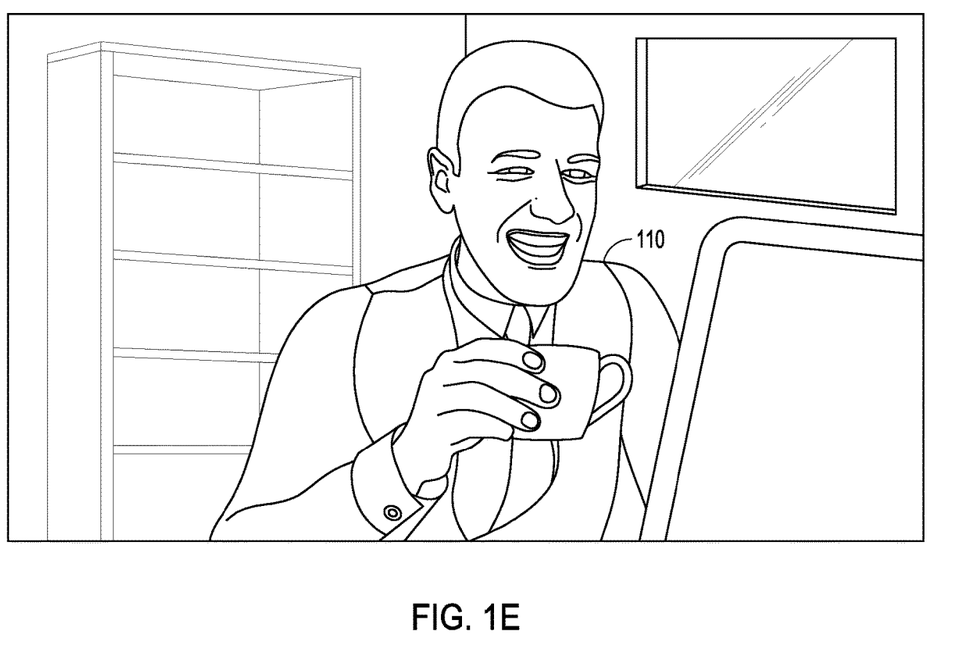
FIG. 1E illustrates the images of FIGS. 1A, 1B, 1C, and 1D with the objects removed from the middle ground.

From the depth information from the depth map, the objects in the middle ground of the image are identified (FIGS. 1C and 1D; 120A and 130A), and the identified objects are removed (FIG. 1E). Standard techniques known in the art are then used to infill or in-paint the removed objects. These standard techniques can involve deep-learning systems. For example, a deep learning algorithm and/or supervised learning algorithm can learn over time what objects are acceptable in the foreground, middle ground, and background of a particular video conferencing environment and what objects are not acceptable. Also, the content from previously captured multiple frames or views can be used to determine what content is (or was) behind the removed object so that that content can be synthesized.

A depth map analysis can be performed on a periodic basis (e.g., every five seconds, fifteen seconds, or some other time period) so that new objects (e.g., a person walking into the scene) or moving objects (e.g., an oscillating fan) can be detected and can be removed as needed.

Figure 2A:
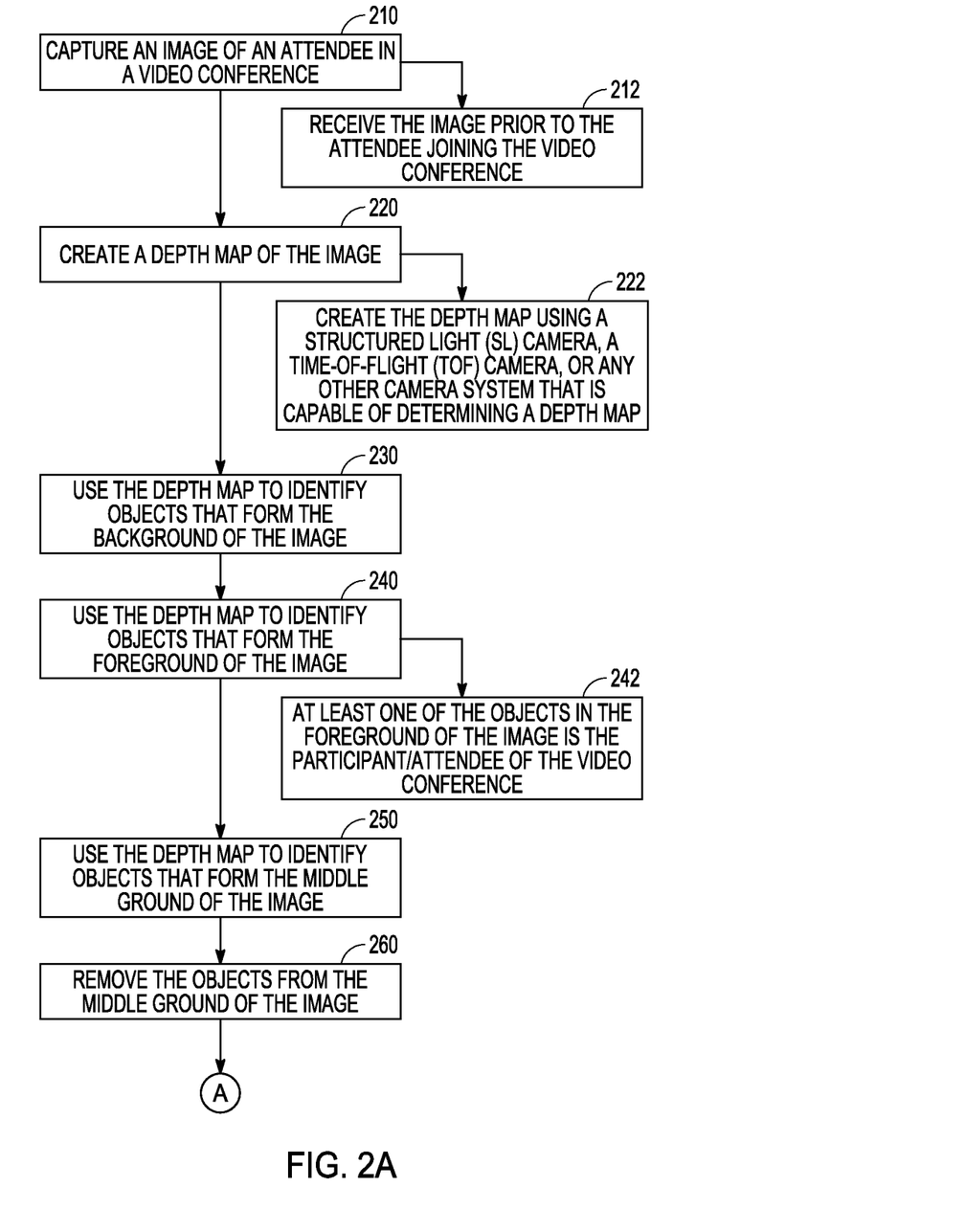
FIGS. 2A and 2B are a block diagram illustrating operations and features of a system that removes objects from an image associated with a video conference.
Figure 2B:
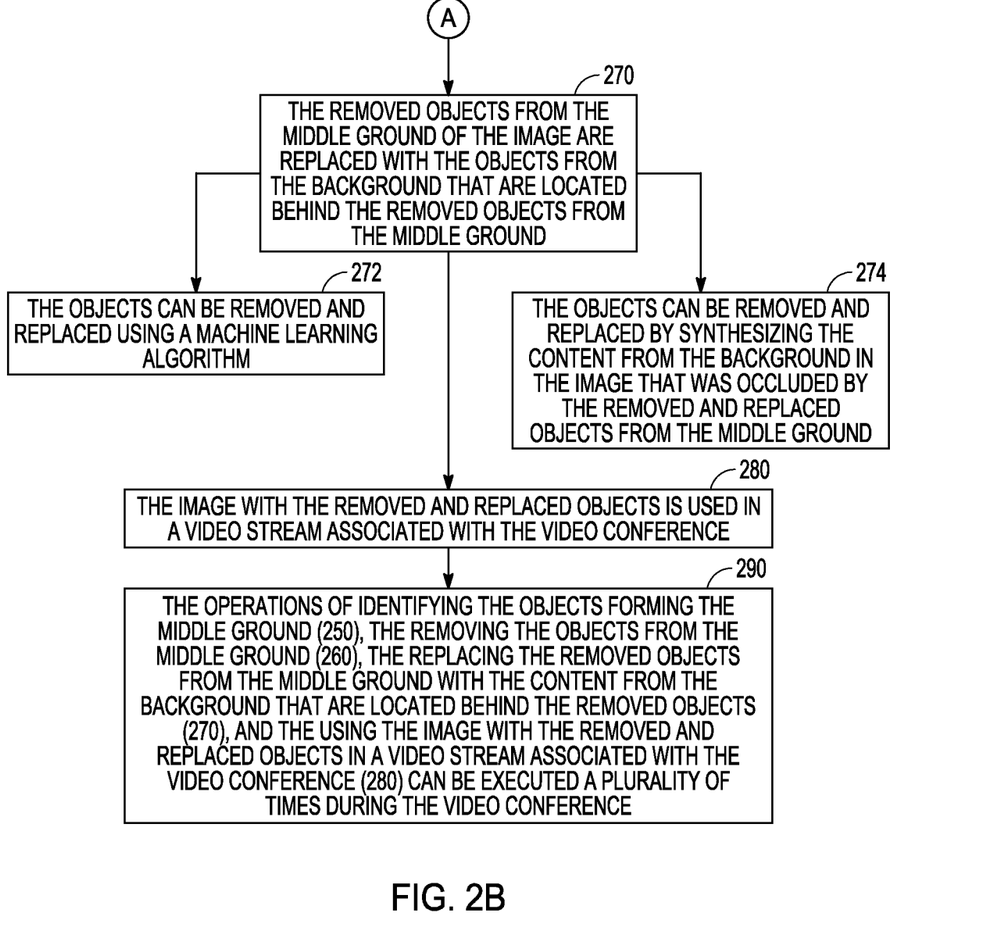

FIGS. 2A and 2B are a block diagram illustrating features and operations to remove objects from an image of a video conference. FIGS. 2A and 2B include a number of feature and process blocks 210-290. Though arranged substantially serially in the example of FIGS. 2A and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 2A and 2B, at 210, an image of an attendee (or a participant) in a video conference is captured. As indicated at 212, in an embodiment, the image is received prior to the attendee joining the video conference. As noted above, most video conferencing systems permit an attendee to personalize the image prior to joining the video conference. Similarly, in this embodiment, the image is received prior to joining the video conference so that the image's middle ground can be analyzed and processed.

At 220, a depth map of the image is created. The depth map can be created using any technique and/or device known to those of skill in the art such as a structured light (SL) camera, a time-of-flight (TOF) camera, or any other camera system that is capable of determining a depth map (222). Then, using the depth map, objects that form the background of the image are identified (230), objects that form the foreground of the image are identified (240), and objects that form a middle ground of the image are identified (250). As indicated at 242, at least one of the objects in the foreground of the image is the participant/attendee of the video conference.

At 260, the system removes the objects from the middle ground of the image. At 270, the removed objects from the middle ground of the image are replaced with the objects from the background that are located behind the removed objects from the middle ground. In an embodiment, the objects can be removed and replaced using a machine learning algorithm (272). For example, if an attendee normally attends video conferences at a local coffee shop, the machine learning algorithm can be trained with many images of the coffee shop, and the algorithm can learn the objects that are normally present in the coffee shop. After the algorithm is trained, current images can be provided to the trained algorithm and the algorithm can infer the objects that should be removed from the middle ground. In another embodiment, the objects can be removed and replaced by synthesizing the contents from the background in the image that were occluded by the removed and replaced objects from the middle ground (274). These occluded contents or objects can be identified and extracted from the most recent frames of the video conference.

At 280, the image with the removed and replaced objects is used in a video stream associated with the video conference.

As indicated at 290, the operations of FIGS. 2A and 2B can be executed a plurality of times during the video conference. Specifically, the operations of identifying the objects forming the middle ground (250), the removing the objects from the middle ground (260), the replacing the removed objects from the middle ground with the content from the background that are located behind the removed objects (270), and the using the image with the removed and replaced objects in a video stream associated with the video conference (280) can be executed a plurality of times during the video conference.

Figure 3:
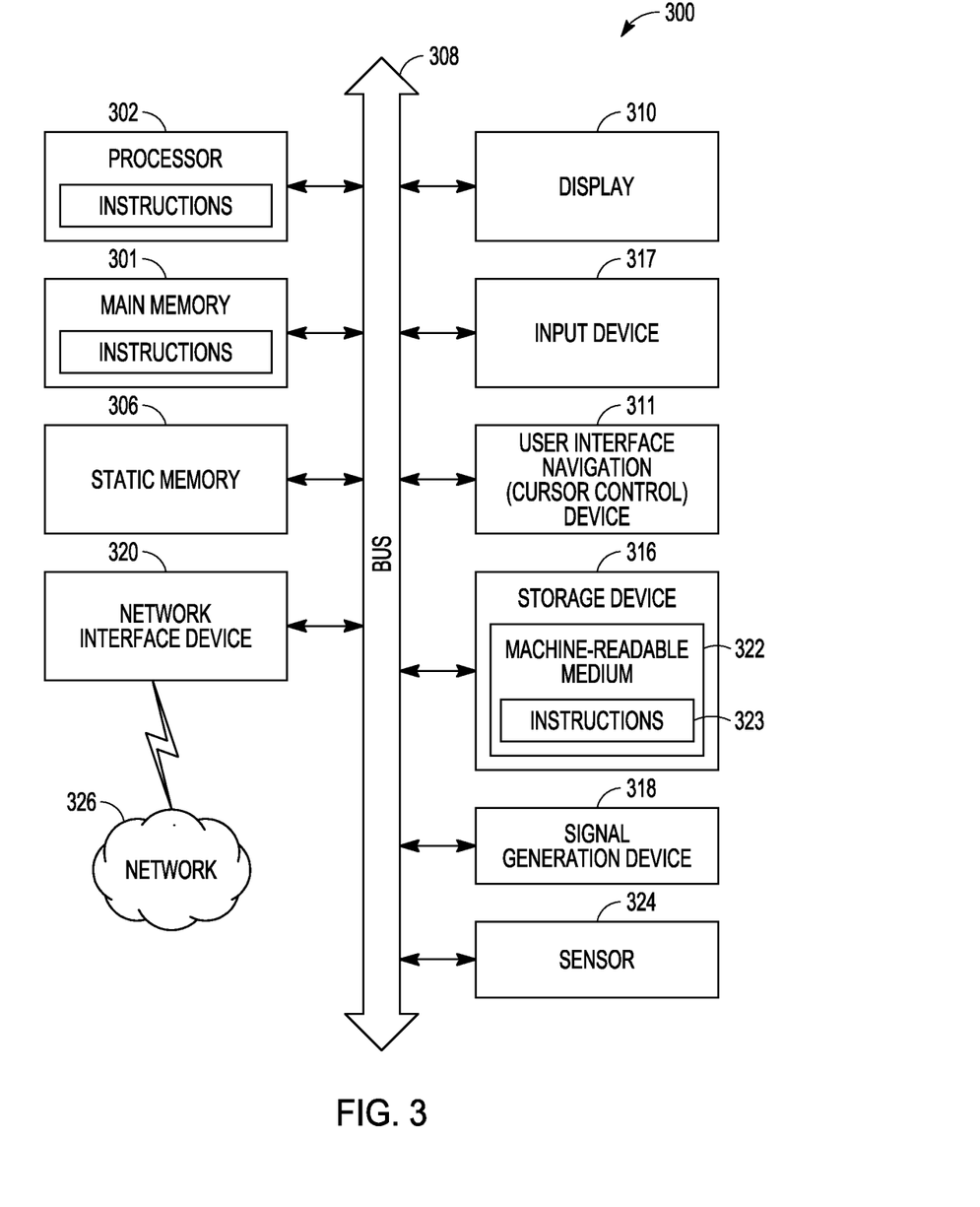
FIG. 3 is a block diagram of a computer system on which one or more embodiments of the present disclosure may execute.

FIG. 3 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a personal computer (PC), however, in alternative embodiments, the machine may be a server computer, a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 301 and a static memory 306, which communicate with each other via a bus 308. The computer system 300 may further include a display unit 310, an alphanumeric input device 317 (e.g., a keyboard), and a user interface (UI) navigation device 311 (e.g., a mouse). In one embodiment, the display, input device and cursor control device are a touch screen display. The computer system 300 may additionally include a storage device 316 (e.g., drive unit), a signal generation device 318 (e.g., a speaker), a network interface device 320, and one or more sensors 324, such as a global positioning system sensor, compass, accelerometer, or other sensor.

The drive unit 316 includes a machine-readable medium 322 on which is stored one or more sets of instructions and data structures (e.g., software 323) embodying or utilized by any one or more of the methodologies or functions described herein. The software 323 may also reside, completely or at least partially, within the main memory 301 and/or within the processor 302 during execution thereof by the computer system 300, the main memory 301 and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 323 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process including receiving into a computer processor an image of a participant in a video conference and surrounding space around the participant; receiving a depth map of the image; identifying one or more objects forming a background in the image using the depth map; identifying one or more objects forming a foreground in the image using the depth map; identifying one or more objects forming a middle-ground in the image using the depth map; removing the one or more objects from the middle-ground; replacing the removed one or more objects from the middle-ground with the one or more objects from the background that are located behind the removed one or more objects; and using the image with the removed and replaced one or more objects in a video stream associated with the video conference.

Example No. 2 includes all the features of Example No. 1, and optionally includes a process wherein the image is received into the computer processor prior to the participant joining the video conference.

Example No. 3 includes all the features of Examples Nos. 1-2, and optionally includes a process wherein the one or more objects forming the foreground comprises at least the participant.

Example No. 4 includes all the features of Examples Nos. 1-3, and optionally includes a process wherein the depth map is created using one or more of a structured light (SL) camera, a time-of-flight (TOF) camera, or any camera system that can determine a depth map.

Example No. 5 includes all the features of Examples Nos. 1-4, and optionally includes a process wherein the removed and replaced one or more objects from the middle-ground are removed and replaced using a machine learning algorithm.

Example No. 6 includes all the features of Examples Nos. 1-5, and optionally includes a process wherein the removed and replaced one or more objects from the middle-ground are removed and replaced by synthesizing the one or more objects from the background in the image that were occluded by the removed and replaced one or more objects from the middle ground.

Example No. 7 includes all the features of Examples Nos. 1-6, and optionally includes a process wherein the identifying the one or more objects forming a middle-ground in the image using the depth map, the removing the one or more objects from the middle-ground, the replacing the removed one or more objects from the middle-ground with the one or more objects from the background that are located behind the removed one or more objects, and the using the image with the removed and replaced one or more objects in a video stream associated with the video conference are executed a plurality of times during the video conference.

Example No. 8 is a non-transitory machine-readable medium including instructions that when executed by a computer processor execute a process of receiving into the computer processor an image of a participant in a video conference; receiving a depth map of the image; identifying one or more objects forming a background in the image using the depth map; identifying one or more objects forming a foreground in the image using the depth map; identifying one or more objects forming a middle-ground in the image using the depth map; removing the one or more objects from the middle-ground; replacing the removed one or more objects from the middle-ground with the one or more objects from the background that are located behind the removed one or more objects; and using the image with the removed and replaced one or more objects in a video stream associated with the video conference.

Example No. 9 includes all the features of Example No. 8, and optionally includes a non-transitory machine-readable medium wherein the image is received into the computer processor prior to the participant joining the video conference.

Example No. 10 includes all the features of Example Nos. 8-9, and optionally includes a non-transitory machine-readable medium wherein the one or more objects forming the foreground comprises at least the participant.

Example No. 11 includes all the features of Example Nos. 8-10, and optionally includes a non-transitory machine-readable medium wherein the depth map is created using one or more of a structured light (SL) camera or a time-of-flight (TOF) camera.

Example No. 12 includes all the features of Example Nos. 8-11, and optionally includes a non-transitory machine-readable medium wherein the removed and replaced one or more objects from the middle-ground are removed and replaced using a machine learning algorithm.

Example No. 13 includes all the features of Example Nos. 8-12, and optionally includes a non-transitory machine-readable medium wherein the removed and replaced one or more objects from the middle-ground are removed and replaced by synthesizing the one or more objects from the background in the image that were occluded by the removed and replaced one or more objects from the middle ground.

Example No. 14 includes all the features of Example Nos. 8-13, and optionally includes a non-transitory machine-readable medium wherein the identifying the one or more objects forming a middle-ground in the image using the depth map, the removing the one or more objects from the middle-ground, the replacing the removed one or more objects from the middle-ground with the one or more objects from the background that are located behind the removed one or more objects, and the using the image with the removed and replaced one or more objects in a video stream associated with the video conference are executed a plurality of times during the video conference.

Example No. 15 is a system including a computer processor; and a computer memory coupled to the computer processor; wherein one or more of the computer processor and the computer memory are operable for receiving into a computer processor an image of a participant in a video conference; receiving a depth map of the image; identifying one or more objects forming a background in the image using the depth map; identifying one or more objects forming a foreground in the image using the depth map; identifying one or more objects forming a middle-ground in the image using the depth map; removing the one or more objects from the middle-ground; replacing the removed one or more objects from the middle-ground with the one or more objects from the background that are located behind the removed one or more objects; and using the image with the removed and replaced one or more objects in a video stream associated with the video conference.

Example No. 16 includes all the features of Example No. 15, and optionally includes a system wherein the image is received into the computer processor prior to the participant joining the video conference.

Example No. 17 includes all the features of Example Nos. 15-16, and optionally includes a system wherein the one or more objects forming the foreground comprises at least the participant.

Example No. 18 includes all the features of Example Nos. 15-17, and optionally includes a system wherein the depth map is created using one or more of a structured light (SL) camera or a time-of-flight (TOF) camera.

Example No. 19 includes all the features of Example Nos. 15-18, and optionally includes a system wherein the removed and replaced one or more objects from the middle-ground are removed and replaced using a machine learning algorithm.

Example No. 20 includes all the features of Example Nos. 15-19, and optionally includes a system wherein the removed and replaced one or more objects from the middle-ground are removed and replaced by synthesizing the one or more objects from the background in the image that were occluded by the removed and replaced one or more objects from the middle ground.

The invention claimed is:

1. A process comprising:
   receiving into a computer processor an image of a participant in a video conference;
   receiving a depth map of the image;
   identifying one or more objects forming a background in the image using the depth map;
   identifying one or more objects forming a foreground in the image using the depth map;
   identifying one or more objects forming a middle-ground in the image using the depth map, wherein the middle-ground comprises an area between an object or a person in the foreground and the background;
   removing the one or more objects from the middle-ground;
   replacing the removed one or more objects from the middle-ground with the one or more objects from the background that are located behind the removed one or more objects; and
   using the image with the removed and replaced one or more objects in a video stream associated with the video conference;
   wherein the identifying the one or more objects forming a middle-ground in the image using the depth map, the removing the one or more objects from the middle-ground, the replacing the removed one or more objects from the middle-ground with the one or more objects from the background that are located behind the removed one or more objects, and the using the image with the removed and replaced one or more objects in a video stream associated with the video conference are executed a plurality of times during the video conference.

2. The process of claim 1, wherein the image is received into the computer processor prior to the participant joining the video conference.

3. The process of claim 1, wherein the one or more objects forming the foreground comprises at least the participant.

4. The process of claim 1, wherein the depth map is created using one or more of a structured light (SL) camera or a time-of-flight (TOF) camera.

5. The process of claim 1, wherein the removed and replaced one or more objects from the middle-ground are removed and replaced using a machine learning algorithm.

6. The process of claim 1, wherein the removed and replaced one or more objects from the middle-ground are removed and replaced by synthesizing the one or more objects from the background in the image that were occluded by the removed and replaced one or more objects from the middle ground.

7. A non-transitory machine-readable medium comprising instructions that when executed by a computer processor execute a process comprising:
   receiving into the computer processor an image of a participant in a video conference;
   receiving a depth map of the image;

identifying one or more objects forming a background in the image using the depth map;
identifying one or more objects forming a foreground in the image using the depth map;
identifying one or more objects forming a middle-ground in the image using the depth map;
removing the one or more objects from the middle-ground;
replacing the removed one or more objects from the middle-ground with the one or more objects from the background that are located behind the removed one or more objects; and
using the image with the removed and replaced one or more objects in a video stream associated with the video conference;
wherein the identifying the one or more objects forming a middle-ground in the image using the depth map, the removing the one or more objects from the middle-ground, the replacing the removed one or more objects from the middle-ground with the one or more objects from the background that are located behind the removed one or more objects, and the using the image with the removed and replaced one or more objects in a video stream associated with the video conference are executed a plurality of times during the video conference.

8. The non-transitory machine-readable medium of claim 7, wherein the image is received into the computer processor prior to the participant joining the video conference.

9. The non-transitory machine-readable medium of claim 7, wherein the one or more objects forming the foreground comprises at least the participant.

10. The non-transitory machine-readable medium of claim 7, wherein the depth map is created using one or more of a structured light (SL) camera or a time-of-flight (TOF) camera.

11. The non-transitory machine-readable medium of claim 7, wherein the removed and replaced one or more objects from the middle-ground are removed and replaced using a machine learning algorithm.

12. The non-transitory machine-readable medium of claim 7, wherein the removed and replaced one or more objects from the middle-ground are removed and replaced by synthesizing the one or more objects from the background in the image that were occluded by the removed and replaced one or more objects from the middle ground.

13. A system comprising:
a computer processor; and
a computer memory coupled to the computer processor;
wherein one or more of the computer processor and the computer memory are operable for:
receiving into the computer processor an image of a participant in a video conference;
receiving a depth map of the image;
identifying one or more objects forming a background in the image using the depth map;
identifying one or more objects forming a foreground in the image using the depth map;
identifying one or more objects forming a middle-ground in the image using the depth map, removing the one or more objects from the middle-ground;
replacing the removed one or more objects from the middle-ground with the one or more objects from the background that are located behind the removed one or more objects; and
using the image with the removed and replaced one or more objects in a video stream associated with the video conference;
wherein the identifying the one or more objects forming a middle-ground in the image using the depth map, the removing the one or more objects from the middle-ground, the replacing the removed one or more objects from the middle-ground with the one or more objects from the background that are located behind the removed one or more objects, and the using the image with the removed and replaced one or more objects in a video stream associated with the video conference are executed a plurality of times during the video conference.

14. The system of claim 13, wherein the image is received into the computer processor prior to the participant joining the video conference.

15. The system of claim 13, wherein the one or more objects forming the foreground comprises at least the participant.

16. The system of claim 13, wherein the depth map is created using one or more of a structured light (SL) camera or a time-of-flight (TOF) camera.

17. The system of claim 13, wherein the removed and replaced one or more objects from the middle-ground are removed and replaced using a machine learning algorithm.

18. The system of claim 13, wherein the removed and replaced one or more objects from the middle-ground are removed and replaced by synthesizing the one or more objects from the background in the image that were occluded by the removed and replaced one or more objects from the middle ground.

* * * * *